Jan. 31, 1967 R. L. NOLAND ET AL 3,301,742
LAMINATE COMPRISING CARBON FIBERS, CARBURIZED
RESIN, AND INORGANIC OXIDE FIBERS
Filed June 23, 1961
Fig. 1.
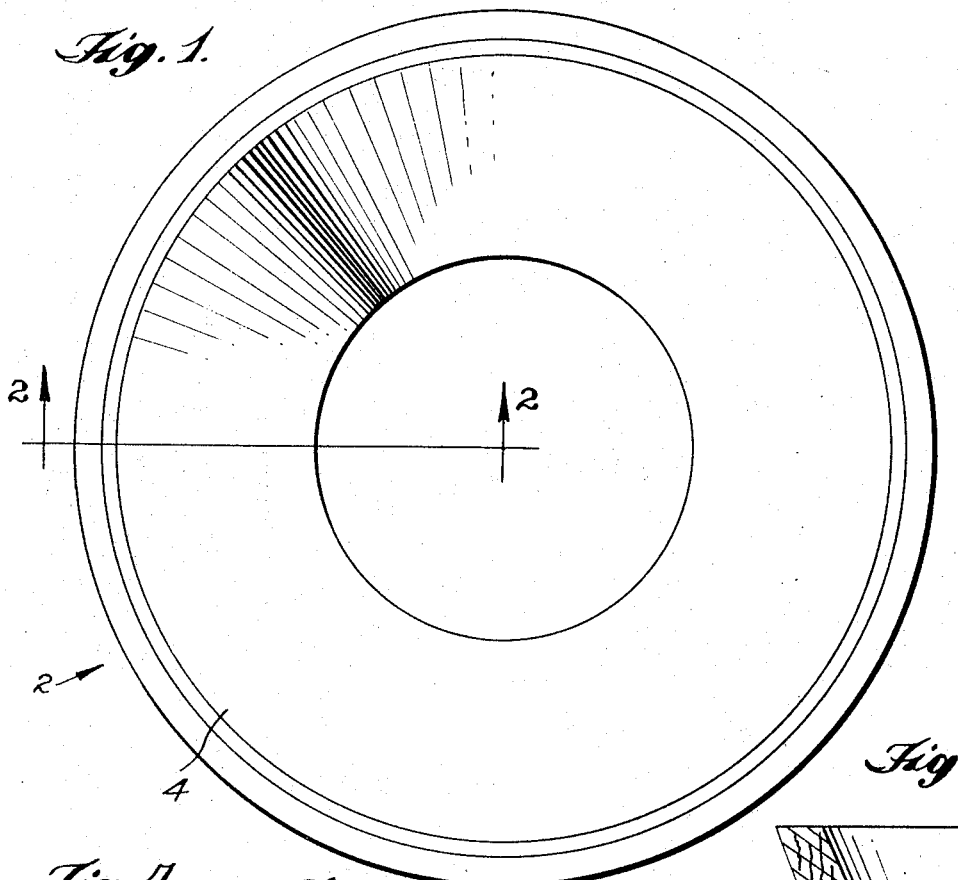
Fig. 2.
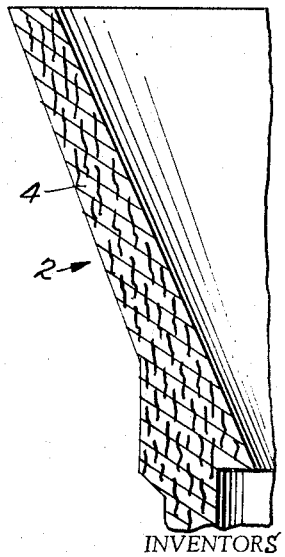
Fig. 4. Fig. 3.
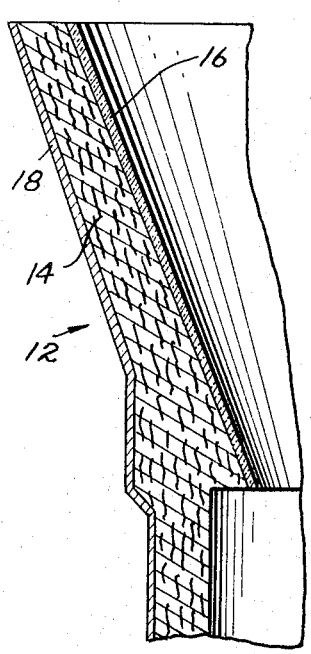
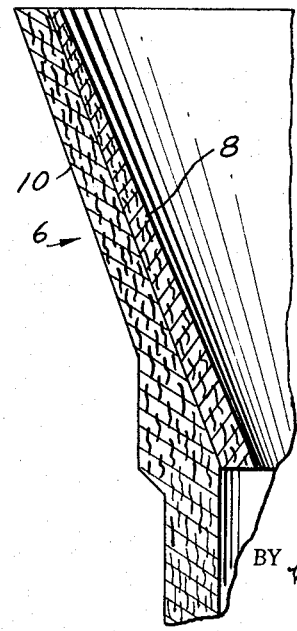
INVENTORS
ROBERT L. NOLAND
WARREN C. TRAVIS
MERVYN B. DAGNEAU
BY Cushman, Darby & Cushman
ATTORNEYS United States Patent Office 3,301,742
Patented Jan. 31, 1967

3,301,742
LAMINATE COMPRISING CARBON FIBERS, CARBURIZED RESIN, AND INORGANIC OXIDE FIBERS
Robert L. Noland, Santa Fe Springs, Warren C. Travis, Lakewood, and Mervyn B. Dagneau, La Mirada, Calif., assignors, by mesne assignments, to Haveg Industries, Inc., a wholly-owned subsidiary of Hercules Powder Company, organized in 1964, New Castle, Del., a corporation of Delaware
Filed June 23, 1961, Ser. No. 119,064
8 Claims. (Cl. 161—170)

This invention relates to materials designed to resist high temperatures.

Current trends in the field of rocketry are directed towards use of higher specific impulse propellents in conjunction with lower weight inert components. The higher energy propellants usually are accompanied with higher temperature products of combustion which result in the inert components being heated to higher temperatures during rocket operation. The net result is that the inert components must be given more protection from overheating through the use of appropriately designed heat insulators. This is especially true when it is realized that the highly stressed inert components are less massive and will thus reach higher temperatures when subjected to comparable heat inputs. Accordingly, the heat insulators perform a very important function in the new highly efficient rocket motors now in use as well as those being designed.

The efficiency of the heat insulator is primarily a function of its ability to withstand the highly erosive forces imposed upon it by the hot gases as well as its ability to exhibit heat transmission characteristics that will not allow the stressed inert component to become overheated during operation. Also of importance is the density of the insulator material since the trend is towards the use of low density materials if they could perform satisfactorily. The current insulators consist primarily of a fibrous type material such as glass, asbestos, silica or quartz bonded together by use of either a low or high pressure molding operation. Recently a new fibrous material has been employed, namely, graphite fibers. This fiber when utilized in conjunction with a phenolic-formaldehyde resin system has exhibited excellent erosion or ablative resistant characteristics when exposed to the high velocity product of combustion of a rocket motor.

Since its thermal conductivity is somewhat greater than other types of insulating materials it is customary to use the graphite material in conjunction with one of the lower conductivity materials, e.g., glass fibers, which is placed between the graphite material and the inert component that is being protected from overheating. This type of design has proven to be very effective when used in nozzle entrance and exit sections.

A major problem has been encountered in the use of graphite fibrous material, especially when employed in the nozzle exit cone of extremely highly erosive rocket motors. One such rocket motor is the third stage Minuteman. The difficulty resolves around a tendency for the material to erode unevenly during operation since, if erosion does occur, it is highly desirable that it occur uniformly about its centerline. When compared with the fibrous graphite insulator the other types of insulating materials exhibit more uniform erosion characteristics but still there is room for improvement. The fibrous graphite material tends, in particular, to exhibit a localized type of erosion known as chunking or spauling in which pieces of material varying in size from approximately ½ to 2 inches in diameter and thicknesses from ⅛ to ⅜ inch are broken away from the prime structure.

It is an object of the present invention to eliminate or reduce the problem of chunking which occurs in materials which are subjected to high temperatures.

Another object is to eliminate the chunking which occurs when insulators comprising fibrous graphite are subjected to high temperatures.

A further object is to obtain a carbonized product having improved physical properties, particularly improved impact properties.

Another object is to obtain improved bonding of metal coatings to high temperature resistant carbonized products.

An additional object is to develop a material which has heat-resistant properties equal to or better than graphite and which, unlike graphite can be molded to shape.

Yet another object is to reduce the density of molded products containing a synthetic resin as a binder.

A further object is to reduce the cracks and fissures when carbonized molded materials are subjected to high temperatures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:
FIGURE 1 is a plan view of one type of rocket insulator;
FIGURE 2 is a sectional view on the line 2—2 of FIGURE 1;
FIGURE 3 is a sectional view similar to FIGURE 2 showing a different type of composition for the insulator; and
FIGURE 4 is a view similar to FIGURE 2 employing another composition for the insulator.

A series of experiments were conducted to establish the basic parameters that are associated with the phenomenon of chunking. In the experiments a fibrous graphite-phenolic-formaldehyde molding compound (70% graphite–30% resin) was utilized in the fabrication of test samples 2.5 inches in diameter by approximately ¼ inch thick. The fibrous graphite-phenol-formaldehyde compound was fabricated from chopped ½ x ½ inch square of graphite fibrous cloth (National Carbon) impregnated with the phenol-formaldehyde resin (e.g., Monsanto SC 1008 Phenolic Resin). These samples were compression molded at molding pressure varying from 1,000 to 35,000 p.s.i. in order to establish the effect of molding pressure on the chunking characteristics. The samples were given a preliminary evaluation testing by subjecting each to an oxygen-acetylene torch jet blast. These tests indicated that the chunking characteristics could not be closely correlated with molding pressure because each sample, regardless of molding pressure, exhibited a tendency towards this type of failure. The specimens molded at the extremely high pressures, above 20,000 p.s.i., exhibited a more violent expulsion of the chunk from the prime structure.

In some instances the samples did not actually fail by chunking, but when these specimens were sectioned and observed they showed that a crack or internal fissure had formed as a result of being subjected to the jet blast. If the molded structure directly above the formed fissure had exhibited lower structural characteristics, chunking would have occurred. This accounts for the sporatic occurrence of chunking since in the molded parts there is a random distribution of fiber resulting in localized variation in strength characteristics. It is not possible to fabricate a part which has perfect distribution of the fibers which would then result in an essentially uniform distribution of structural characteristics. This was verified by fabricating and testing samples in which a macerate of the graphite fiber-phenol-formaldehyde molding compound was utilized. This resulted in a molded specimen in which none of the fibers exceeded a length of 1/16 inch, whereas in the initial specimen the average fiber length amounted to 1/2 inch. When these specimens were subjected to the jet blast test, chunking occurred in every instance. This program indicated that the chunking characteristics occurred as the result of the formation of gases within the molded structure. To rectify this it is necessary to provide a means for exhausting the gases from the structure as they form.

It has been found that by using carefully controlled carbonizing conditions that structures fabricated from resin or elastomer bound carbon fibers, preferably graphite cloth, will not chunk. The parts should be constructed so that it is not possible for erosive gases to rip large pieces of the cloth material from the fabricated structure. This can be accomplished through the use of a tape or shingle type structure or by use of a longitudinal shingle or rosette type structure. In each of such structures only the edge of each layer of material is exosed to the hot products of combustion.

In order to reduce the formation of gases in a phenolic resin molded part, it is customary to subject the part to a post curing cycle. The molding operation is customarily performed at a temperature of 280° to 300° F. (138–149° C.). It is not considered good practice to post cure above this temperature because the resin usually begins to oxidize or char at tempreatures above 400° F. (204° C.). An analysis was made of the gases released from a molded part made of 70% fibrous graphite and 30% phenol-formaldehyde resin (resole type). The tests were conducted in an evacuated chamber to avoid a chemical reaction between the resin and oxygen.

These results are tabulated in the following table:

| Temperature | | Percent $H_2O$ | Percent $CO_2$ | Percent CO | Percent $CH_4$ | Percent Unidentified Hydrocarbon |
|---|---|---|---|---|---|---|
| ° F. | (° C.) | | | | | |
| 400 | (204) | 0.600 | 0.0060 | Nil | Nil | Nil |
| 500 | (260) | 1.110 | 0.0147 | 0.0036 | Nil | 0.0001 |
| 600 | (316) | 0.315 | 0.0223 | 0.0102 | 0.00059 | 0.0001 |
| 700 | (371) | 0.899 | 0.0330 | 0.0121 | 0.00187 | 0.0003 |
| 700* | (371) | 0.003 | 0.0090 | 0.0370 | Nil | Nil |
| 800 | (427) | 1.530 | 0.0470 | 0.0184 | 0.00960 | 0.0004 |
| 900 | (482) | 1.760 | 0.0799 | 0.0523 | 0.06730 | 0.0009 |
| 900* | (482) | Nil | 0.1900 | 0.4300 | 0.28000 | Nil |

*The parts were post cured to 900° F. (482° C.) before the gas analysis. All the other samples were given a standard 6 day post cure at 280°–300° F. (138–149° C.).

The date of the tables demonstrates that the majority of the gases form at temperatures above 500° F. (260° C.) which is above the temperature range for recommended post cures of current high heat-resistant type materials.

A series of other tests were carried out which demonstrated the feasibility of post curing high pressure molded graphite-phenol formaldehyde resin products at temperatures above 500° F. (260° C.). It was found essential that precautionary measures to prevent oxygen from coming into contact with the specimens during the post curing be taken. If oxygen is allowed to come into contact with the molded specimens the resin is completely burned away.

In order to avoid a rapid expulsion of the gases formed with attendant rupturing of the molded products test specimens were slowly heated according to the invention from room temperature to 900° F. (482° C.) and then held at that temperature for periods of time ranging from 1 to 60 hours.

The post cured specimens were then subjected to the oxygen-acetylene torch jet blast to determine their erosion resistance characteristics. These tests showed that a more uniform type of erosion is obtained by utilizing the slow heating to 900° F. according to the invention rather than by conventional post curing. Sectioned specimens after test indicated that there was no formation of fissures or cracks, provided the specimens were maintained at the elevated post curing temperature (900° F.) for a sufficient period of time. On the other hand, a specimen not treated according to the invention exhibited deep localized type hole formation with a connecting deep crack. A sample post cured to 800° F. had a shallower and broader type erosion hole with connected cracks. The samples post cured to 900° F. for one and 60 hours exhibited no crack formations and shallow, broad type erosion holes.

Thus, by following the teachings of the invention through proper post cure it is possible to eliminate the formation of internal cracks as well as to alter the complete erosion characteristics. The erosion characteristics are changed primarily because of a complete alteration of the material because of the post cure. The thermal conductivity of the novel post cured material is approximately 3 times that of a non-post cured specimen. Consequently, the heat from the jet blast is transmitted away from the impingement area much more rapidly, resulting in lower surface temperatures in this area as well as lower thermal gradients through the specimen. Not only is chunking eliminated thereby but the erosion characteristics more nearly approach those exhibited by ATJ or similar graphite materials. Normally ATJ graphite exhibits approximately one-half the erosion sustained by a high pressure molded graphite-phenol-formaldehyde resin when subjected to the same erosive conditions.

The specimens maintained at 900° F. for 60 hours had a complete change in structure. The resin was completely carbonized and the resulting particles of carbon acted as the bonding medium for the carbon fibers. In another experiment in which the post cure was carried out at 950° F. (510° C.) a reduction in specific gravity from 1.45 for the molded product to 1.35 for the post cured product was obtained. It is a characteristic of the present invention that the post curing results in a less dense material.

By carbonizing all the way through the product it is possible to get rid of all the gases. As previously set forth it is important to obtain a substantially non-gaseous product. Preferably the gases are removed by carbonizing at 900–1000° F. (482–538° C.) The temperature should be below the graphiting temperature. After the gases have been removed the temperature can be elevated as high as 5500° F. (3150° C.).

While 900–1000° F. is preferred for the carbonizing step, the temperature of carbonizing can be increased to 1832° F. (1000° C.). After formation of the post cured product it can then be graphatized, e.g., by heating to 5432° F. (3000° C.). However, as previously indicated it is important that the removal of gas in the carbonizing step be carried out at 900–1850° F. even if it is desired to subsequently graphitize the product.

The graphite fibers can range from 1/32 of an inch up to several inches (e.g. 3 or 4) in length or there can be employed a graphite cloth structure which can be quite long, e.g. a complete roll of graphite cloth. The carbon fibers, including the carbonized cloth can be made for example by carbonizing Fortisan (cellulose triacetate fibers), nylon fibers (e.g. polymeric hexamethylene adipamide), polyester fibers, e.g. polyethplene terephthalate, polyurethane fibers [e.g. from 2,4-toluene diisocyanate and the ester of propylene glycol and ethylene glycol with adipic acid or from 2,4-toluene diisocyanate and polyethylene glycol (molecular weight about 500)].

The carbon fibers are preferably 3–4 microns in diameter but can range from 1 micron or smaller to 100 microns or larger as monofilaments or can be woven into cloth or yarn up to 6000 microns thick.

There can be used chopped graphite clots of $\frac{1}{32}'' \times \frac{1}{32}''$ or $\frac{1}{16}'' \times \frac{1}{16}''$ or $\frac{1}{2}'' \times \frac{1}{2}''$ as well as long rolls, as previously set forth. The carbon fibers also can be in the form of cordage, yarn or the like.

In place of adding the resin or elastomer to precarburized fibers, organic fibers can be impregnated with the resin or elastomer, cured and then the entire mass carburized after molding to desired shape, e.g. at 1000–30,000 p.s.i. Typical fibers include Fortisan, nylon, polyethylene terephthalate, urethane, polyacrylonitrile fibers, etc. The fibers should have essentially zero ash for the best results. As the resin or elastomer there can be employed any of those mentioned previously or hereinafter.

In the present invention it is important that the rate of heat be such that gas diffusion can take place without physically rupturing the solid. The rate of heating depends on the thickness of the material. Generally, the increase in temperature is 1–10° F./hour (0.6–5.6° C./hour) over the range of 300 or 400° F. to 900 or 1000° F. A slightly higher rate up to 20° F. (about 10° C.) can be used in some cases. A slower rate of temperature rise is permissible but cuts down on production. The heating cycle may take as long as 12 days or more.

It is important to exclude oxygen during the carbonizing. Thus, the material can be wrapped in a protective substance, e.g. tinfoil, which is impervious to oxygen or there can be employed an atmosphere of nitrogen, argon, helium, flue gas, carbon monoxide or even a high vacuum, e.g. less than 1 mm.

It has been found that the carbonized products of the present invention, due to their porous structure, mechanically lock metals such as tungsten, tantalum, copper hafnium, molybdenum, aluminum, and other sprayable or castable metals. Conventional molded carbon products do not lock the metals in the same manner.

The present invention is particularly designed for applications where resistance to temperatures of at least 2000° F., and even 4000° F., 6000° F. or higher, e.g., 25,000° F., is required. The resistance should not merely be instantaneous but normally the insulator should protect against the indicated temperatures for many seconds, or even many minutes, e.g., 15 minutes or more.

The products of the present invention can be utilized as exit cone insulators, nose cone insulators, nozzle insulators, reentry skin panels, throat piece insulators, booster insulators, bulkhead insulators, rocket combustion chamber insulators and, in general, where a heat insulating or ablative resistant material is required.

From 5–60% by weight of the total of carbon fibers and resin (or elastomer) is resin and the balance is carbon fibers. In some instances a preferred ratio is about 30% of resin and 70% of fibers. The use of not over 10% resin or elastomer, e.g., 5% resin and 95% carbon fibers is frequently advantageous for making the molded pieces. The time of heating and the amount of gassing is reduced thereby.

Unless otherwise stated all parts and percentages are by weight.

It is frequently desirable to make laminates of silica or silicate fibers, e.g., glass fibers, to carbon fibers. The same resins or elastomers can be employed with the silicate fibers. Likewise the proportion of resin or elastomer to silicate fibers can be from 5–60% by weight of resin or other polymer, and the balance the inorganic fibers. Glass fibers of 0.09 to 3 microns diameter are preferred. In place of silicate fibers there can be used alumina fibers as well as other metal oxide fibers, e.g., zirconia fibers and asbestos fibers of both the chrysotile and amphibole variety, e.g. anthophyllite and amosite.

The laminate can be made of equal amounts of silicate fibers and carbon fibers or either can predominate.

In making the laminate resin impregnated glass fiber, e.g. glass cloth impregnated with 30% of phenol-formaldehyde resin, is preformed to size and the resin impregnated graphite fibers, e.g., graphite cloth impregnated with 30% of phenolformaldehyde resin is separately preformed to size. The two preforms are then assembled together, heat and pressure, e.g., 280° F. and 5000 p.s.i., applied and then the resin is carburized by raising the temperature from 280° F. to 950° F., by raising the temperature at a rate of 5° F./hour in a nitrogen atmosphere. In this manner all of the gases formed are removed.

As the resin or elastomer there can be employed any of the materials in Ward Patent 2,835,107. Typical examples include thermosetting resins including phenolformaldehyde resins, phenol-furfural, m-cresol-formaldehyde, xylenol - formaldehyde, resorcinol - formaldehyde, urea-formaldehyde, amino-triazine-aldehyde resins, e.g., melamine-formaldehyde, furfuryl alcohol resins, furfuryl alcohol-furfural, epoxy resins, e.g., those having glycidyl groups in such quantity that the material has a 1,2-epoxy equivalency in the average molecule of greater than one. As examples of epoxy resins there can be used bisphenol-A epichlorhydrin, resorcinol-epichlorhydrin, glycerol-epichlorhydrin, novolak-epichlorhydrin, etc.

Also, there can be used triallyl cyanurate resin, diethylene glycol bis allyl carbonate resins, diallyl phthalate resin and polyester resins, e.g., polyesters made from glycols such as ethylene glycol, diethylene glycol, propylene glycol, dipropylene glycol, butanediol 1,3 and dibasic acids such as maleic acid, fumaric acid, cis-3,6-endomethylene-$\Delta^4$-tetrahydrophthalic acid, hexachloroendomethylene tetrahydrophthalic acid, itaconic acid, citraconic acid, etc. There can be used saturated aliphatic and aromatic acids such as succinic acid, adipic acid, phthalic acid, tetrachlorophthalic acid. Also, there can be employed alcohols such as glycerine, pentaerythritol, trimethylolpropane and trimethylolethane, as well as acids such as citric acid, trimesic acid, hemimellitic acid, etc. In making the polyester resin, vinyl or vinylidene monomers can be incorporated such as styrene, vinyl toluene, e.g., o-vinyl toluene, diallyl phthalate, methyl methacrylate, vinyl acetate, p-chlorostyrene. A typical polyester is a styrene modified propylene glycol phthalic anhydride maleic anhydride condensation product.

Resins which have been cross-linked by chemical means or by irradiation can be employed. Thus, there can be used polyethylene which has been cross-linked by peroxides, e.g., benzoyl peroxide, or by irradiation, e.g., by subjection to 2 to 200 megarep of high energy ionizing radiation as shown in Rainer et al. Patent 2,877,500, butadiene resins, styrene-divinyl benzene copolymer, etc.

As elastomers (or rubbers) there can be used natural rubber, butadiene-styrene copolymers, butadiene-acrylonitrile copolymers, butadiene-vinyl pyridine copolymers, isobutylene-isoprene copolymers, isobutylene-butadiene copolymers (butyl rubber) and other isoolefin copolymers as set forth in Sparks et al. Patent 2,356,128, neoprene, polysulfide rubbers as shown in Patrick Patent 2,195,380 (polyalkylene polysulfides and the like).

The proportions of resin or elastomer to fiber, as previously indicated, can range from 5 to 60% resin or elastomer to the total of resin or elastomer and carbon fiber.

Referring to the drawings, there is provided in FIGURES 1 and 2 an exit cone 2 having an insulator 4 made of fibrous graphite cloth (National Carbon) impregnated with 29% by weight of phenol-formaldehyde resin (Monsanto SC 10008) and chopped into ½ inch squares. The impregnated cloth was preformed to size at a temperature below 180° F. (82° C.). The preform was then molded utilizing a pressure applied at a rate of 50 p.s.i./sec. until an equivalent molding pressure of 6500 p.s.i. was reached. The molding die assembly was then heated to a temperature of 300° F. (149° C.) for 2 hours. The molded product was then removed from the die, placed in vacuo (less than 1 mm.) and carburized by raising the temperature from 300 to 950° F. at a rate of 2° F./hour. It took approximately 13½ days to reach 950° F.

The resultant insulator upon firing of a rocket containing the same, wherein the insulator was subjected to temperatures above 6000° F. for over 60 seconds did not develop cracks or fissures and there was no noticeable chunking. The molded carburized product was less dense than the molded product prior to carburizing. It had a strength several times greater than that of graphite. The carburized product was also characterized by a metallic ring when struck with an object. The electrical properties of the carburized product were also different from those of the starting material.

In general, the carburized molded product exhibited properties superior to ATJ graphite.

As shown in FIGURE 3 an exit cone insulator 6 was made of a composite laminate of fibrous graphite molded layer 8 and fibrous silicate molded layer 10.

The fibrous graphite in cloth form was chopped into ½ inch squares and impregnated with 29% by weight of phenol-formaldehyde resin. Silica fiber cloth (Sil Temp) was chopped into ½ inch squares and impregnated with 30% by weight of the phenol-formaldehyde resin. The graphite and silica sections were preformed to size at a temperature below 180° F. The two preforms were then inserted in a high pressure die having a punch temperature of 150° F. and a cavity temperature of 200° F. The molding pressure on the assembled preforms was applied at a rate of 50 p.s.i./sec. until an equivalent molding pressure of 6500 p.s.i. was reached. The molding die assembly was then heated to a temperature of 300° F. and maintained at this temperature for 2 hours. The molded laminate was removed from the die and argon passed over the laminate while the temperature was raised to 950° F. at a rate of 2° F./hour to produce the finished exit cone insulator. This insulator proved resistant to chunking upon firing at over 6000° F. for over one minute.

FIGURE 4 shows an exit cone insulator 12 having a composite laminate of resin bonded fibrous graphite 14 and resin bonded fibrous silicate 16. The laminate was of the same composition as that described in connection with FIGURE 3. The laminate was molded and carburized in the same manner as that set forth in connection with FIGURE 3. After carburizing metallic tantalum was sprayed on the graphite cloth layer to give a coating 18 of tantalum which was locked tenaciously to the porous carbon layer 14.

In place of 29% phenol-formaldehyde resin as set forth in connection with the drawings the resin content can be reduced to 5% with a shortening in the post cure time, i.e., the time of gradual heating, e.g., from 300 to 950° F.

The insulators of the present invention can be employed with any of the rockets designed for use at high temperatures, such as the rocket shown in FIGURE 1 of Ward Patent 2,835,107.

In connection with FIGURE 2, for example, in place of employing graphite cloth impregnated with phenol-formaldehyde resin there can be employed Fortisan cloth impregnated with 30% of phenol-formaldehyde resin. The impregnated product molded to desired shape at 300° F. and 5000 p.s.i. and the entire assembly carburized in vacuo (1 mm. or less) while the temperature is raised at a rate of 1° F./hour from 300 to 950° F.

What is claimed is:

1. A laminate comprising a layer of carbon fibers bound together by a carburized member of the group consisting of resins and elastomers united to a layer of inorganic oxide fibers bound together by a carburized member of the group consisting of aminotriazine-aldehyde resins, furfuryl alcohol containing resins, phenolic resins, epoxy resins, polyester resins, triallyl cyanurate, butadiene-styrene copolymer, butadiene-acrylonitrile copolymer, butadiene vinyl pyridine copolymer, neoprene, urea-formaldehyde resin and butyl rubber.

2. A laminate according to claim 1 wherein the inorganic oxide fibers are silicate fibers.

3. A laminate according to claim 2 wherein the binder for both the carbon fibers and the silicate fibers is carburized phenol-formaldehyde resin.

4. A laminate according to claim 3 wherein said carbon fiber layer is also united to a metal layer.

5. A laminate comprising a layer of porous carbon fibers bound together by a carburized member of the group consisting of aminotriazine-aldehyde resins, furfuryl alcohol containing resins, phenolic resins, epoxy resins, polyester resins, triallyl cyanurate, butadiene-styrene copolymer, butadiene-acrylonitrile copolymer, butadiene vinyl pyridine copolymer, neoprene, urea-formaldehyde resin and butyl rubber united to a layer of metal securely locked thereto.

6. A laminate according to claim 5 wherein said metal is tantalum.

7. A method of preparing a more porous solid, molded carbonized article comprising heating a solid, molded laminate of (1) carbon fibers bonded by a member of the group consisting of aminotriazine-aldehyde resins, furfuryl alcohol containing resins, phenolic resins, epoxy resins, polyester resins, triallyl cyanurate, butadiene-styrene copolymer, butadiene-acrylonitrile copolymer, butadiene vinyl pyridine copolymer, neoprene, urea-formaldehyde resin and butyl rubber and (2) inorganic oxide fibers bonded by a member of the group consisting of aminotriazine-aldehyde resins, furfuryl alcohol containing resins, phenolic resins, epoxy resins, polyester resins, triallyl cyanurate, butadiene-styrene copolymer, butadiene-acrylonitrile copolymer, butadiene vinyl pyridine copolymer, neoprene, urea-formaldehyde resin and butyl rubber in an inert atmosphere while the temperature is slowly raised from 400 to 900° F. to carbonize said member and increase the porosity of the article.

8. A method according to claim 7 wherein the heating is conducted at a rate of not over 10° F./hour and the inorganic oxide fibers are silicate fibers.

References Cited by the Examiner

UNITED STATES PATENTS

| | | | |
|---|---|---|---|
| 2,511,472 | 6/1950 | Kmecik | 117—160 |
| 2,601,337 | 6/1952 | Smith et al. | 154—2.75 |
| 2,795,440 | 6/1957 | Holycross et al. | |
| 2,946,711 | 7/1960 | Bragow et al. | 154—2.75 |
| 2,972,552 | 2/1961 | Winter. | |
| 2,977,251 | 3/1961 | Long | 117—160 |
| 3,010,398 | 11/1961 | Parlanti | 102—92.5 |
| 3,022,190 | 2/1962 | Feldman | 102—92.5 |
| 3,053,775 | 9/1962 | Abbott. | |
| 3,107,152 | 10/1963 | Ford | 23—209.2 |
| 3,174,895 | 3/1965 | Gibson | 161—259 |

OTHER REFERENCES

Chemical Engineering, May 4, 1959, p. 70.

EARL M. BERGERT, *Primary Examiner.*

ROGER L. CAMPBELL, DOUGLAS J. DRUMMOND,
*Examiners.*

W. T. HOUGH, *Assistant Examiner.*